United States Patent
Liu et al.

(10) Patent No.: US 11,501,800 B2
(45) Date of Patent: Nov. 15, 2022

(54) HARD DISK FAULT HANDLING METHOD, ARRAY CONTROLLER, AND HARD DISK

(71) Applicant: Huawei Technologies Co., Ltd., Shenzhen (CN)

(72) Inventors: Guoxia Liu, Chengdu (CN); Liming Wu, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/549,094

(22) Filed: Dec. 13, 2021

(65) Prior Publication Data

US 2022/0108724 A1 Apr. 7, 2022

Related U.S. Application Data

(63) Continuation of application No. 17/226,588, filed on Apr. 9, 2021, now Pat. No. 11,264,055, which is a continuation of application No. 17/167,231, filed on Feb. 4, 2021, now Pat. No. 11,322,179, which is a continuation of application No. PCT/CN2019/104163, filed on Sep. 3, 2019.

(30) Foreign Application Priority Data

Sep. 5, 2018 (CN) .......................... 201811028931.7
Nov. 30, 2018 (CN) .......................... 201811451958.7

(51) Int. Cl.
*G11B 5/09* (2006.01)
*G11B 20/18* (2006.01)

(52) U.S. Cl.
CPC ...... *G11B 20/1879* (2013.01); *G11B 20/1883* (2013.01)

(58) Field of Classification Search
None
See application file for complete search history.

(56) References Cited

U.S. PATENT DOCUMENTS 5,327,671 A 7/1994 Rosek
6,198,709 B1 * 3/2001 Shirane .............. G11B 20/1883
(Continued)

FOREIGN PATENT DOCUMENTS

CN 101276302 A 10/2008
CN 103295648 A 9/2013
(Continued)

OTHER PUBLICATIONS

NVML_Express_1_2_Gold_2014-12-09, 205 pages.

*Primary Examiner* — Peter Vincent Agustin
(74) *Attorney, Agent, or Firm* — Conley Rose, P.C.

(57) ABSTRACT

A storage array includes a plurality of hard disks, where each of the hard disks is divided into a plurality of chunks, and a plurality of chunks of different hard disks form a chunk group using a redundancy algorithm. The storage array obtains fault information of a faulty area in a first hard disk, and determines a faulty chunk storing the lost data according to the fault information. The storage array recovers the data in the faulty chunk using another chunk in a chunk group to which the faulty chunk belongs and stores the recovered data in a recovered chunk. The recovered chunk is located in a second hard disk which is not a hard disk for forming the chunk group.

20 Claims, 15 Drawing Sheets

(56) References Cited

U.S. PATENT DOCUMENTS

| | | | |
|---|---|---|---|
| 6,327,671 B1 | 12/2001 | Menon | |
| 8,843,806 B2 | 9/2014 | Meaney et al. | |
| 9,110,797 B1 * | 8/2015 | Lazier | G06F 11/1048 |
| 2011/0066768 A1 | 3/2011 | Brittner et al. | |
| 2016/0092326 A1 | 3/2016 | Wu et al. | |
| 2017/0270000 A1 | 9/2017 | Gao et al. | |
| 2017/0315879 A1 | 11/2017 | Park et al. | |
| 2017/0315891 A1 * | 11/2017 | Park | G06F 11/2094 |
| 2018/0173442 A1 | 6/2018 | Kirkpatrick et al. | |
| 2018/0307607 A1 * | 10/2018 | Sato | G06F 12/0862 |
| 2018/0357019 A1 * | 12/2018 | Karr | G06F 11/2005 |
| 2019/0391889 A1 | 12/2019 | Luo et al. | |
| 2020/0104051 A1 | 4/2020 | Wu et al. | |
| 2020/0133811 A1 | 4/2020 | Gao et al. | |
| 2021/0158841 A1 * | 5/2021 | Liu | G06F 11/1076 |
| 2022/0108724 A1 * | 4/2022 | Liu | G06F 11/1088 |

FOREIGN PATENT DOCUMENTS

| | | |
|---|---|---|
| CN | 103534688 A | 1/2014 |
| CN | 104484251 A | 4/2015 |
| CN | 105843699 A | 8/2016 |
| CN | 106371947 A | 2/2017 |
| CN | 108345519 A | 7/2018 |
| JP | 2017201519 A | 11/2017 |
| WO | 2014190501 A1 | 12/2014 |

\* cited by examiner

| ASC (Additional detection code) | ASCQ (Attachment detection code qualifier) | Description |
|---|---|---|
| 00 | ... | ... |
| 00 | ... | ... |
| 5D | ... | |
| ... | ... | ... |
| 5D | 6D | No data in a disk is lost |
| 5D | 6E | Data in a disk is lost |
| ... | ... | |

FIG. 5

Informational exception log page

| Byte | Description | Return value |
| --- | --- | --- |
| 0 | ... | ... |
| 1 | ... | ... |
| ... | ... | ... |
| 8 | INFORMATIONAL EXCEPTION ADDITIONAL SENSE CODE (ASC) | 5D |
| 9 | INFORMATIONAL EXCEPTION ADDITIONAL SENSE CODE QUALIFIER (ASCQ) | 6D |
| 10 | ... | ... |
| 11 | INFORMATION | 00 00 00 00 00 01 00 00 |
| 12 | | |
| 13 | | |
| 14 | | |
| 15 | | |
| 16 | | |
| 17 | | |
| 18 | | |

FIG. 6

Descriptor format sense data

| Byte | Field definition | Value |
|---|---|---|
| 0 | ... | ... |
| 1 | ... | ... |
| 2 | ASC | 5D |
| 3 | ASCQ | 6D/6E |
| ... | ... | ... |
| 11 | INFORMATION | 00 00 00 00 00 01 00 00 |
| 12 | | |
| 13 | | |
| 14 | | |
| 15 | | |
| 16 | | |
| 17 | | |
| 18 | | |

FIG. 7

Solid state device statistics page

| Byte | Description | Value |
|---|---|---|
| 0 to 7 | ... | ... |
| 8 to 15 | ... | ... |
| 16 to 23 | A bit 0 to a bit 15 indicate that a type of exception information is a chunk fault. A bit 16 to a bit 23 are used to indicate whether there is a faulty chunk in a hard disk. If a chunk is faulty, the bit is set to 1. A bit 24 to a bit 31 are used to indicate whether data in the faulty chunk is lost. If data is lost, the bit is set to 1. A bit 32 to a bit 55 are reserved. A bit 55 to a bit 63 indicate a device statistics mark. | 00 02 01 01 00 00 00 00 |
| 24 to 31 | A bit 0 to a bit 63 indicate a fault capacity. | 00 02 01 01 00 01 00 00 |
| 32 to 511 | ... | ... |

FIG. 8

Health information log

| Byte | Description (bit) | Value |
|---|---|---|
| 0 | 0... | ... |
| | 1... | ... |
| | ... | ... |
| | 5: If the bit is set to 1, there is a faulty chunk in a hard disk. | 1 |
| 2:1 | ... | ... |
| 9:6 | If the seventh bit in the ninth byte is set to 1, it indicates that data is lost. The sixth bit in the ninth byte to a zeroth bit in the sixth byte indicate a fault capacity. | 00 00 00 00 00 01 00 00 (in hexadecimal) |

FIG. 9

HARD DISK FAULT HANDLING METHOD, ARRAY CONTROLLER, AND HARD DISK

CROSS-REFERENCE TO RELATED APPLICATIONS

This application is a continuation of U.S. patent application Ser. No. 17/226,588 filed on Apr. 9, 2021, which is a continuation of U.S. patent application Ser. No. 17/167,231 filed on Feb. 4, 2021, which is a continuation of International Patent Application No. PCT/CN2019/104163 filed on Sep. 3, 2019, which claims priority to Chinese Patent Application No. 201811451958.7 filed on Nov. 30, 2018 and Chinese Patent Application No. 201811028931.7 filed on Sep. 5, 2018. All of the aforementioned patent applications are hereby incorporated by reference in their entireties.

TECHNICAL FIELD

The present disclosure relates to the field of storage technologies, and in particular, to a handling method performed after a storage area in a hard disk is faulty, and an array controller and a hard disk that perform the handling method.

BACKGROUND

Because data cannot be written into a solid-state disk in the local place but only in a remote place, a part of redundant space needs to be reserved in the solid-state disk for data to be written into the solid-state disk, to improve performance of the solid-state disk. A nominal capacity provided by the solid-state disk does not include a capacity of the redundant space.

When a fault occurs in an area (for example, a DIE is faulty, which is referred to as a faulty area) in the solid-state disk, in order not to reduce the nominal capacity, the faulty area needs to be compensated for by using the capacity of the redundant space. Consequently, the capacity of the redundant space is reduced. A wear degree of the solid-state disk is increased due to the reduction of the redundant space, thereby affecting performance of the solid-state disk.

SUMMARY

Embodiments of the present disclosure provide a handling method performed after a faulty area occurs in a hard disk. According to the handling method, after the faulty area occurs in the hard disk, redundant space of the hard disk is not reduced, and therefore a wear degree of the hard disk is not increased.

A first aspect of the embodiments of the present disclosure provides a hard disk fault handling method. The method is performed by an array controller in a storage array. The storage array includes a plurality of hard disks, each of the hard disks is divided into a plurality of chunks, and a plurality of chunks of different hard disks form a chunk group by using a redundancy algorithm. The method includes obtaining fault information of a faulty area that is in a first hard disk and in which a fault occurs, when the fault information indicates that data in the faulty area is lost, determining a faulty chunk in which the lost data is located, recovering the data in the faulty chunk by using another chunk in a chunk group to which the faulty chunk belongs, storing the recovered data in a recovered chunk, where the recovered chunk is located in a second hard disk, and the second hard disk is a hard disk other than hard disks in which the chunk group is located, and recording a correspondence between an address of the data in the faulty chunk in the first hard disk and an address of the recovered data block in the second hard disk.

The lost data in the faulty chunk in the first hard disk is recovered to the recovered chunk in the second hard disk, and the correspondence between the address of the faulty chunk in the first hard disk and the address of the recovered chunk in the second hard disk is recorded. In this way, redundant space of the first hard disk is not reduced, so that performance of the first hard disk is ensured.

In the embodiment of the first aspect, two manners of obtaining the fault information of the faulty area that is in the first hard disk and in which a fault occurs are provided. In a first manner, the array controller receives the fault information reported by the first hard disk. In a second manner, the array controller sends a fault query command to the first hard disk, and then receives the fault information reported by the first hard disk according to the fault query command.

Optionally, the fault information includes an identifier indicating whether data is lost, and it is determined, based on the identifier, that data in the faulty area is lost.

In the embodiment of the first aspect, two manners of determining the faulty chunk in which the lost data is located are provided. In a first manner, the array controller obtains an address of a first chunk in the first hard disk in the first hard disk, and sends a data loss fault query command to the first hard disk, where the fault query command carries the address of the first chunk in the first hard disk. After receiving the query instruction, the first hard disk determines whether the address carried in the query instruction includes a part or all of an address of the faulty area, and if the address carried in the query instruction includes the part or all of the address of the faulty area, the first hard disk uses a return message of the query instruction to carry indication information indicating that the first chunk includes the lost data, or if the address carried in the query instruction does not include the part or all of the address of the faulty area, the first hard disk uses a return message of the query instruction to carry indication information indicating that the first chunk does not include the lost data. After receiving indication information that is returned by the first hard disk and that indicates whether the first chunk includes the lost data, if the array controller determines that the indication information indicates that the first chunk includes the lost data, the array controller determines that the first chunk is the faulty chunk, and then generates a new data loss fault query command, where the new data loss fault query command carries an address of a second chunk in the first hard disk in the first hard disk.

In a second manner of determining the faulty chunk in which the lost data is located, the array controller sends a faulty area fault query command to the first hard disk, receives information that is returned by the first hard disk and that includes an address of the faulty area, and determines the faulty chunk based on the address of the faulty area.

Optionally, the fault information includes a capacity of the faulty area. The method further includes obtaining the capacity of the faulty area that is in the fault information, and adding the capacity of the faulty area to a total fault capacity of the first hard disk, and when determining that the total fault capacity is greater than a preset value, prompting a user to replace the first hard disk.

Compared with the other approaches in which a wear degree of the hard disk is detected, a manner of detecting a total capacity lost by the hard disk to determine whether to replace the hard disk is more convenient and more accurate.

A second aspect of the present disclosure provides a hard disk fault handling method. The method is performed by an array controller in a storage array, the storage array includes a first hard disk, and the first hard disk includes a faulty area. The method includes obtaining fault information of the faulty area, determining a capacity of the faulty area based on the fault information, migrating some data in the first hard disk to a second hard disk based on the capacity, and recording a mapping relationship between an address of the migrated data in the first hard disk and an address of the migrated data in the second hard disk.

Optionally, the first hard disk and another hard disk in the storage array form a logical disk by using a redundancy algorithm. The method further includes determining, based on the fault information, whether data in the first hard disk is lost, and if the data in the first hard disk is lost, recovering the data in the first hard disk by using the redundancy algorithm.

The lost data in the hard disk can be recovered in time by obtaining information about the lost data in the hard disk and a redundancy algorithm between the hard disks.

A third aspect of the present disclosure provides a hard disk fault handling method, which is performed by a hard disk. The method includes detecting a faulty area in the hard disk, determining whether data in the faulty area is lost, setting, based on a determining result, a mark indicating whether data in the faulty area is lost, and reporting, to an array controller, a mark indicating that the hard disk includes the faulty area and the mark indicating whether data in the faulty area is lost that are used as fault information.

Optionally, the hard disk further records a capacity of the faulty area, and reports the capacity of the faulty area that is used as fault information to an array controller.

The array controller can sense a lost capacity of the faulty area by reporting the capacity of the faulty area in the hard disk. Therefore, when receiving a write request, an array can allocate the write request to a hard disk with a relatively large remaining capacity, to better control the hard disk.

Optionally, the method further includes determining whether the capacity of the faulty area is greater than a preset value, and when the capacity of the faulty area is greater than the preset value, reporting the fault information to the array controller.

When the capacity of the faulty area is greater than the preset value, the fault information is reported, to avoid impact on performance of the storage array that is caused by frequent reporting of the fault information.

In the implementation of the third aspect, when there are different communication protocols between the hard disk and the array controller, manners of recording and reporting the fault information by the hard disk are also different. When a communication protocol between the hard disk and the array controller is a Small Computer System Interface (SCSI) protocol, the fault information is recorded on an informational exception log page in the SCSI protocol.

In the SCSI protocol, the fault information is reported in two manners. A first manner is receiving an input/output (I/O) request sent by the array controller, and reporting the fault information to the array controller by using response information that is for the I/O request and that includes the informational exception log page. A second manner is receiving a fault information query request sent by the array controller, and reporting the fault information by using response information that is for the fault information query request and that includes the informational exception log page.

When a communication protocol between the hard disk and the array controller is an Advanced Technology Attachment (ATA) protocol, the fault information is recorded on a solid state device statistics page in the ATA protocol, and in this case, a manner of reporting the fault information is receiving a fault information query request sent by the array controller, and reporting the fault information by using response information that is for the fault information query request and that includes the solid state device statistics page.

When a communication protocol between the hard disk and the array controller is a Non-Volatile Memory Express (NVMe) protocol, the fault information is recorded in a health information log in the NVMe protocol, and in this case, a manner of reporting the fault information is reporting the fault information by using response information that is for an asynchronous event request and that includes the solid-state device statistics page.

A fourth aspect of the present disclosure provides a hard disk fault handling method. A difference between the hard disk fault handling method provided in the fourth aspect and the hard disk fault handling method provided in the first aspect lies only in that after the recovered data is stored in the recovered chunk, the faulty chunk in the chunk group is replaced with the recovered chunk, and a correspondence between the recovered chunk and the faulty chunk does not need to be recorded.

A fifth aspect of the present disclosure provides an array controller corresponding to the hard disk fault handling method provided in the first aspect. Functions performed by function modules of the array controller are the same as the steps included in the hard disk fault handling method provided in the first aspect. Details are not described herein again.

A sixth aspect of the present disclosure provides an array controller corresponding to the hard disk fault handling method provided in the second aspect. Functions performed by function modules of the array controller are the same as the steps included in the hard disk fault handling method provided in the second aspect. Details are not described herein again.

A seventh aspect of the present disclosure provides a hard disk corresponding to the hard disk fault handling method provided in the third aspect. Functions performed by function modules of the hard disk are the same as the steps included in the hard disk fault handling method provided in the third aspect. Details are not described herein again.

An eighth aspect of the present disclosure provides an array controller corresponding to the hard disk fault handling method provided in the fourth aspect. Functions performed by function modules of the array controller are the same as the steps included in the hard disk fault handling method provided in the fourth aspect. Details are not described herein again.

A ninth aspect of the present disclosure provides an array controller. The array controller includes a processor and a computer readable storage medium, the storage medium stores a program instruction, and the processor runs the program instruction to perform the hard disk fault handling method according to the first aspect, the second aspect, or the fourth aspect.

A tenth aspect of the present disclosure provides a hard disk. The hard disk includes a processor and a computer readable storage medium, the storage medium stores a program instruction, and the processor runs the program instruction to perform the hard disk fault handling method according to the third aspect.

An eleventh aspect of the present disclosure provides a computer readable storage medium. The computer readable storage medium stores an instruction, and when the instruction is run on a computer, the computer is enabled to perform the method according to the first aspect, the second aspect, the third aspect, or the fourth aspect.

BRIEF DESCRIPTION OF DRAWINGS

To describe technical solutions in some embodiments of the present disclosure more clearly, the following briefly describes accompanying drawings for describing some of the embodiments.

FIG. 5 shows additional sense code (ASC) code and attachment sense code qualifier (ASCQ) code that indicate a faulty area in a hard disk and that are defined in the SCSI protocol according to an embodiment of the present disclosure.

FIG. 6 is a diagram of an example of an informational exception log page in the SCSI protocol according to an embodiment of the present disclosure.

FIG. 7 is a schematic diagram of descriptor format sense data in return information of an I/O request according to an embodiment of the present disclosure.

FIG. 8 is a schematic diagram of a solid-state device statistics page defined in the ATA protocol according to an embodiment of the present disclosure.

FIG. 9 is a schematic diagram of a health information log defined in the NVMe protocol according to an embodiment of the present disclosure.

DESCRIPTION OF EMBODIMENTS

The following clearly and completely describes technical solutions in the embodiments of the present disclosure with reference to the accompanying drawings in the embodiments of the present disclosure. It is clear that the described embodiments are merely some but not all of the embodiments of the present disclosure.

Figure 1:
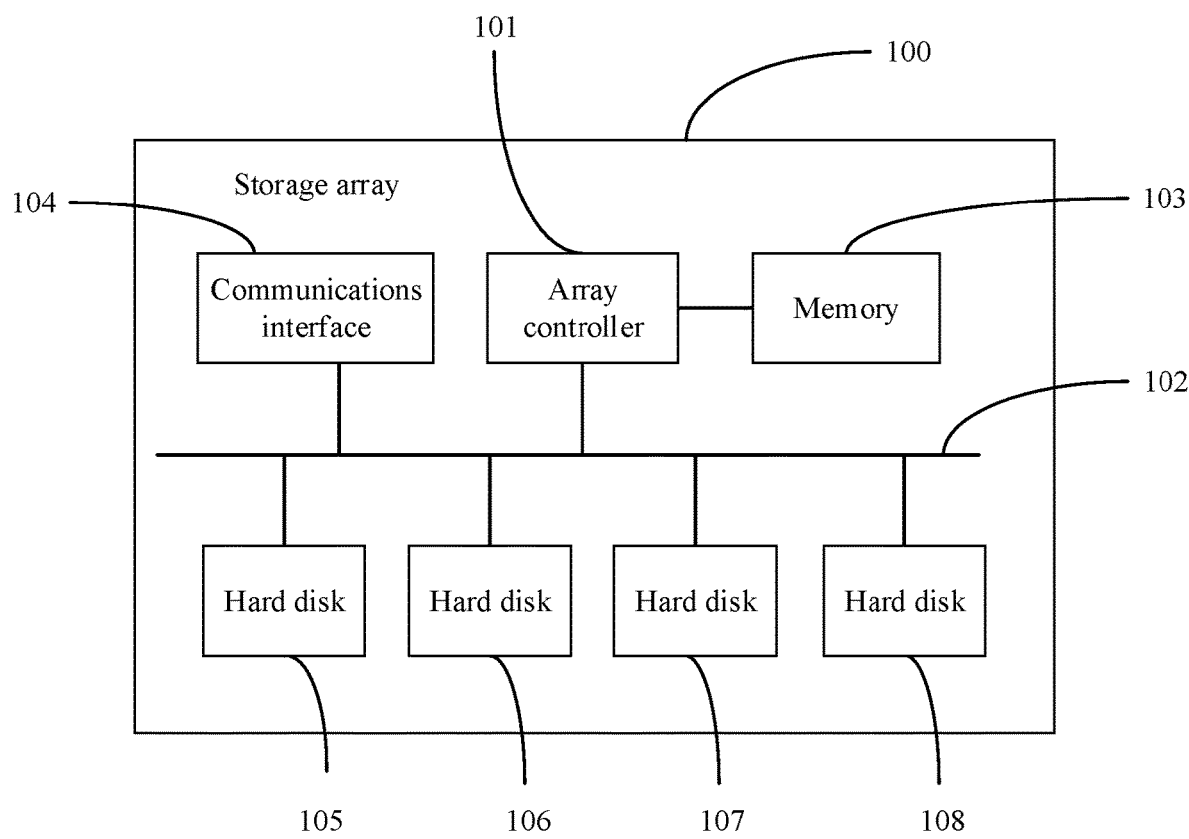
FIG. 1 is a structural diagram of a storage array.

FIG. 1 is a structural diagram of a storage array 100. The storage array 100 includes an array controller 101, a plurality of hard disks 105 to 108, memory 103, a communications interface 104, and a bus 102. The array controller 101 is configured to run a program (not shown in the figure) in the memory 103 to manage the hard disks 105 to 108 and access data in the hard disks 105 to 108. The communications interface 104 is configured to connect to a host (not shown in the figure), and the host may transmit a read/write instruction or a management instruction to the storage array 100 through the communications interface 104. The communications interface may be a NVMe interface, or may be an SCSI interface.

Figure 2:
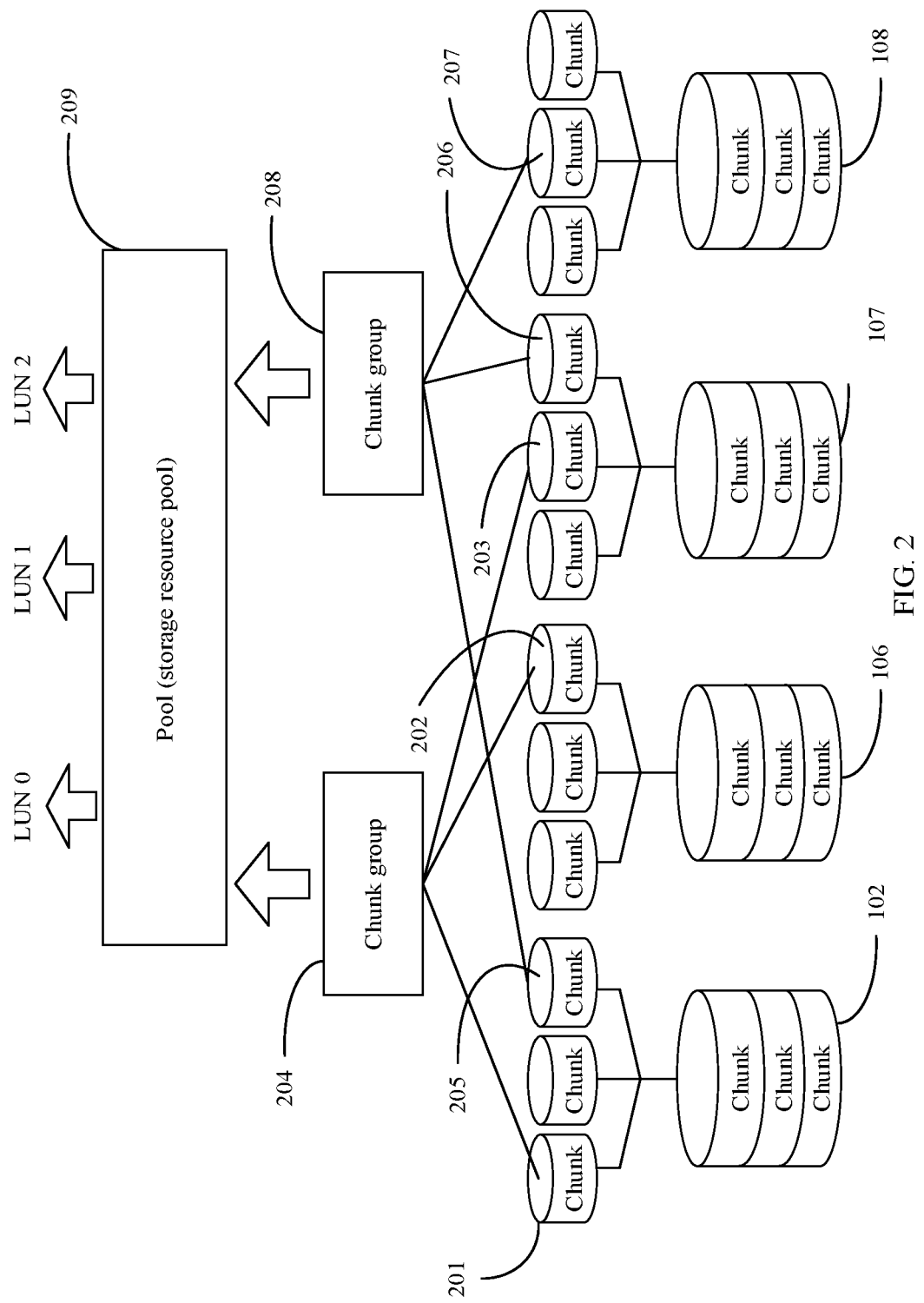
FIG. 2 is a schematic diagram of generating a logical disk by an array controller according to Embodiment 1 of the present disclosure.

FIG. 2 is a schematic diagram in which an array controller 101 generates a logical disk provided for a host to use according to Embodiment 1 of the present disclosure. When the storage array 100 is a flash array using the NVMe interface, the host communicates with the storage array 100 by using the NVMe protocol, and the logical disk generated by the storage array 100 may be represented by using a namespace defined in the NVMe protocol. When the storage array 100 is a storage array using the SCSI interface, the host communicates with the storage array 100 by using the SCSI protocol, and the hard disk may be represented by using a logical unit number (LUN) defined in the SCSI protocol. In the embodiment in FIG. 2, a process in which the array controller 101 generates the LUN by using the SCSI protocol is used as an example for description.

As shown in FIG. 2, each of the hard disks 105 to 108 in the storage array 100 is divided into chunks of a same size, and chunks belonging to different hard disks form a chunk group by using a RAID algorithm. As shown in FIG. 2, a chunk 201 belonging to the hard disk 102, a chunk 202 belonging to the hard disk 106, and a chunk 203 belonging to the hard disk 107 form a chunk group 204 by using a RAID 5 algorithm. A chunk 205 belonging to the hard disk 102, a chunk 206 belonging to the hard disk 107, and a chunk 207 belonging to the hard disk 108 form a chunk group 208 by using the RAID 5 algorithm. After the chunk group is generated, the storage controller 101 records hard disks in which chunks forming each chunk group are located. A storage resource pool 209 is constructed based on the chunk group, and logical disks such as a LUN 0, a LUN 1, and a LUN 3 are constructed based on the storage resource pool 209.

Figure 3:
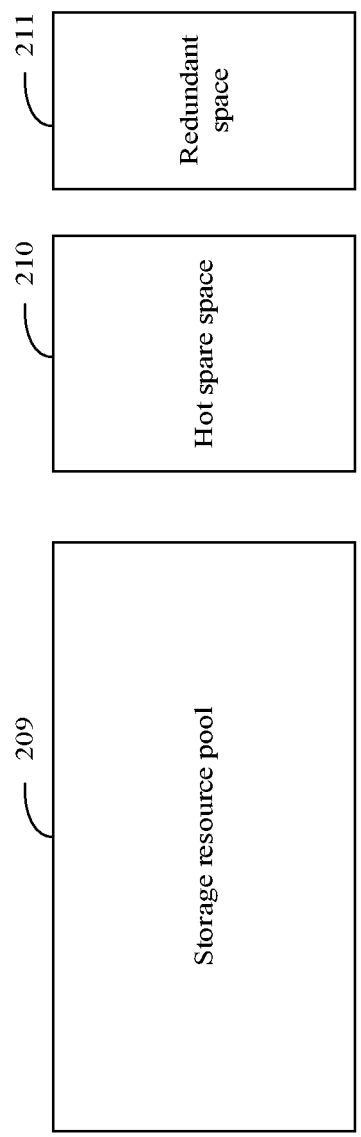
FIG. 3 is a schematic diagram of providing hot spare space and redundant space by a storage array according to Embodiment 1 of the present disclosure.

As shown in FIG. 3, in this embodiment of the present disclosure, in addition to the storage resource pool 209, the storage array 100 further provides hot spare space 210 and redundant space 211. The hot spare space 210 is configured to, after a chunk in the hard disk is faulty, recover data in the faulty chunk and replace the faulty chunk. The redundant space is space reserved by the storage array 100, the storage array 100 does not provide a size of the redundant space to the outside, and the redundant space is configured to improve performance of the storage array 100. The hot spare space 210 and the redundant space 211 each may be a single hard disk, or may be pooling space formed by chunks in a plurality of hard disks. In this embodiment of the present disclosure, the hot spare space and the redundant space each may be divided into granularities of the same size as the chunks, and are configured to replace the faulty chunk in the hard disk. How to use the hot spare space 210 and the redundant space 211 to replace the faulty chunk in the hard disk is described in detail below when a hard disk fault handling method is described.

As described in the background, in the other approaches, after the faulty area (namely, a segment of storage space in which a fault occurs in the hard disk) is generated in the hard disk, for example, after a DIE fault in the hard disk, the array controller 100 does not sense the fault, and therefore does not handle the fault. Then, after detecting that a wear degree of the hard disk reaches a threshold, the array controller 100 directly performs disk replacement processing. However, when the wear degree of the hard disk does not reach the threshold, redundant space of the hard disk is reduced due to the faulty area, and performance of a storage system is affected due to the reduction of the redundant space.

According to the fault handling method provided in this embodiment of the present disclosure, the array controller 100 can determine the faulty chunk in which the faulty area in the hard disk is located, and replace the faulty chunk with a chunk in the redundant space 211 or the hot spare space 210, so that performance of the entire storage system is not affected.

Figure 4:
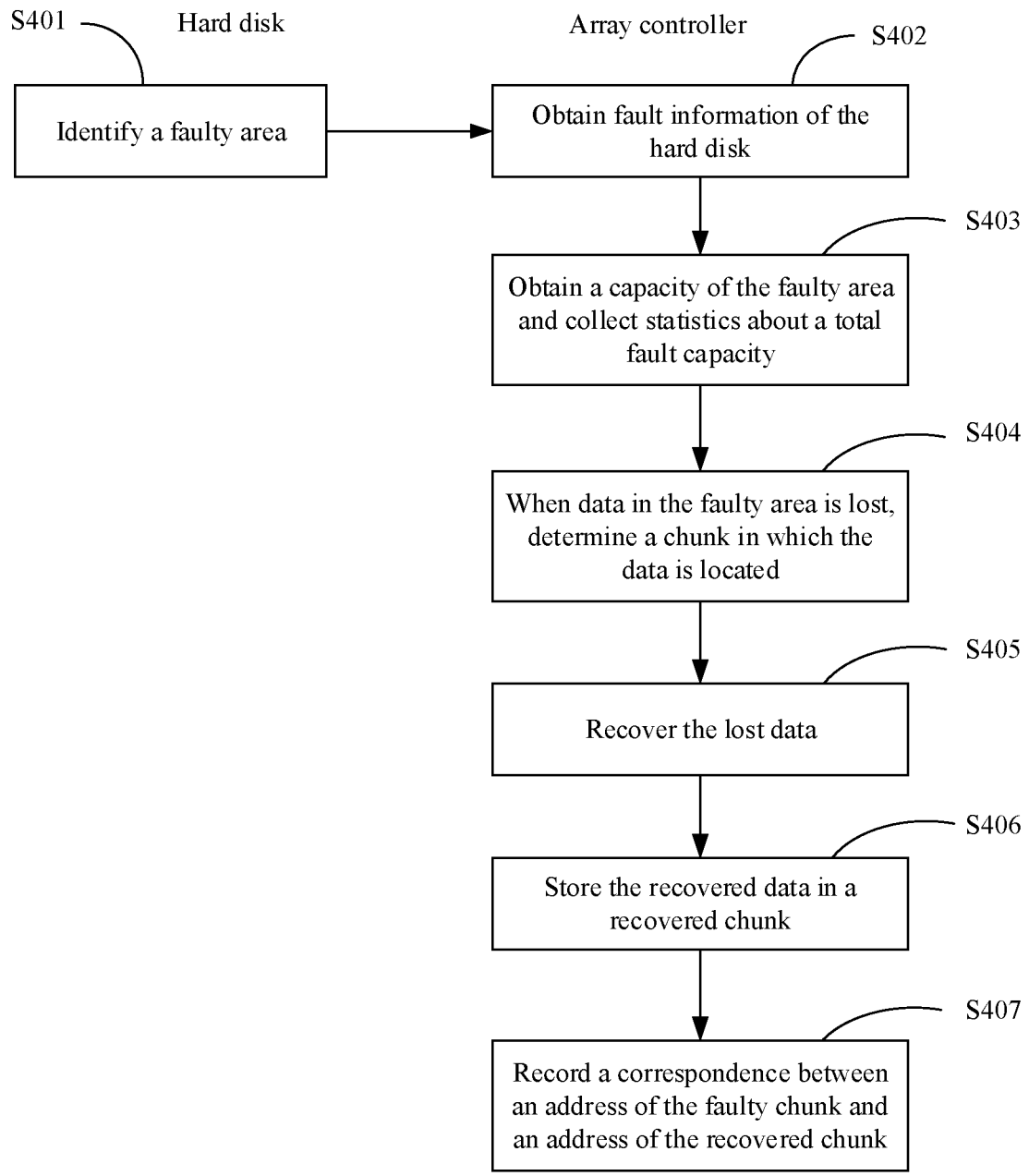
FIG. 4 is a flowchart of processing a faulty area in a hard disk by a storage array according to Embodiment 1 of the present disclosure.

The following describes a hard disk fault handling method in an embodiment of the present disclosure by using a flowchart in FIG. 4.

FIG. 4 is a flowchart of a method for processing a faulty area in a hard disk by a storage system in an architecture shown in FIG. 2. The following descriptions are provided only by using an example in which the hard disk 105 in the storage array 100 is faulty.

Step S401: The hard disk 105 identifies a faulty area in the hard disk 105, and accumulates capacities of faulty areas.

The faulty area may be a DIE particle in a flash of the hard disk, or may be a segment of space in the hard disk. In a hard disk running process, the hard disk collects statistics about a quantity of times of an exception of a storage area in the hard disk. When a quantity of times of a type of exception of a storage area exceeds a preset value, the storage area may be identified as the faulty area. The exception may be an error checking and correction error (ECC error), an uncorrectable ECC code error (UNC), a slow response to I/O, a timeout of a response to I/O, or the like. The faulty area may be identified in any manner in the other approaches. This is not limited herein. A function performed by the hard disk is implemented by a processor (not shown in the figure) in the hard disk by executing a segment of program code stored in memory (not shown in the figure) in the hard disk.

Step S402: The array controller 101 obtains fault information of the faulty area in the hard disk 105. The fault information includes an identifier indicating whether data in the faulty area is lost. In some embodiments, the fault information further includes a capacity of the faulty area.

In actual application, some hard disks perform a RAID such as a RAID 1 or a RAID 5 with a data recovery capability in the hard disks to ensure data reliability. In this way, even if there is a faulty area in the hard disk, data in the faulty area can be recovered by using a RAID algorithm in the hard disk, and therefore the data is not lost. If the hard disk does not perform an in-disk RAID or performs a RAID in which data cannot be recovered, for example, a RAID 0, the data in the faulty area cannot be recovered, and therefore the data is lost. Therefore, in this embodiment of the present disclosure, the array controller 101 obtains the identifier indicating whether data in the faulty area is lost, to subsequently recover the lost data in the faulty area.

In this embodiment of the present disclosure, for different communication protocols between the hard disk 105 and the storage array 100, manners of obtaining the fault information are also different. The following separately describes manners of obtaining the fault information of the faulty area in the different communication protocols.

1. SCSI Protocol

In the existing SCSI protocol, ASC and an ASCQ are defined, and different ASC and ASCQs are used to identify an exception generated in a hard disk. After the exception of the hard disk is detected, the ASC and the ASCQ that correspond to the exception are recorded on an informational exception log page. The informational exception log page is a log page that is defined in the SCSI protocol and that is used to record the exception of the hard disk. In the existing SCSI protocol, when the ASC is 5D, it indicates that a failure prediction threshold is exceeded. To be specific, when a parameter in a monitored hard disk exceeds a specified threshold, the parameter needs to be reported to an array controller. Each parameter that needs to be detected in the hard disk is defined in each ASCQ corresponding to 5D. Because an ASCQ used to report the faulty area in the hard disk is not defined in the existing SCSI protocol, and a capacity of the faulty area cannot be reported, ASCQ code 6D and 6E indicating a fault status of the faulty area are defined in this embodiment of the present disclosure. FIG. 5 shows definitions of newly defined ASCQ code 6D and 6E according to an embodiment of the present disclosure. Herein, 6D indicates that a faulty area occurs in a hard disk but no data is lost, and 6E indicates that a faulty area occurs in a hard disk and data is lost. When the faulty area in the hard disk is detected and a total fault capacity reaches a preset value, 6D or 6E is recorded on the informational exception log page based on whether data in the faulty area is lost. FIG. 6 is a diagram of an example of an informational exception log page. When a fault capacity of a faulty area reaches a preset value and no data is lost, 5D is filled in an informational exception ASC indicated by the eighth byte on the informational exception log page, and 6D is filled in an informational exception ASCQ indicated by the ninth byte on the informational exception log page. When a capacity of a faulty area reaches a preset value and data is lost, 5D is filled in informational exception ASC indicated by the eighth byte on the informational exception log page, and 6E is filled in an informational exception ASCQ indicated by the ninth byte on the informational exception log page. In addition, optionally, the capacity of the faulty area is recorded in an information (information) byte on the informational exception log page. As shown in FIG. 6, "00 00 00 00 00 01 00 00" (in hexadecimal) is carried, namely, an 8 gigabyte (GB) fault capacity. The foregoing ASCQ code 6D and 6E are merely examples for description. In actual use, any ASCQ that is not used in the protocol in the ASC 5D may be used.

In the SCSI protocol, the fault information of the faulty area may be obtained in two manners.

In a first manner, the hard disk 105 actively reports the fault information of the faulty area.

After an I/O request sent by the array controller 101 is received, when exceptional code such as 5D and 6E is recorded in the informational exception ASC byte and the informational exception ASCQ byte on the informational exception log page, 5D, 6E, and the fault capacity 8G recorded in the information byte are written into descriptor format sense data in return information for the I/O request. As shown in FIG. 7, if the descriptor format sense data includes an ASC byte and an ASCQ byte, the ASC code 5D and the ASCQ code 6D/6E obtained from the informational exception log page are filled in the ASC and the ASCQ in the descriptor format sense data. In addition, if the descriptor format sense data further includes an information byte, the capacity of the faulty area may be written into the information byte in the descriptor format sense data.

In this way, after receiving the return information for the I/O request, the array controller 101 may obtain the fault information of the faulty area in the hard disk from the descriptor format sense data in the return information.

In a second manner, the array controller 101 periodically queries the fault information of the faulty area in the hard disk 105.

In this manner, the array controller 101 periodically sends a fault query command to the hard disk 105, where the fault query command carries an identifier of the informational exception log page. After receiving the fault query command, the hard disk 105 returns the informational exception log page to the array controller 101. After receiving the log page, the array controller 101 obtains ASC, an ASCQ, and content corresponding to information from the log page. If the ASC and the ASCQ are 5D and 6D respectively, the array controller 101 may learn that an exception of the hard disk 105 indicates that a faulty area occurs, and no data in the faulty area is lost. If the ASC and the ASCQ are 5D and 6E respectively, the array controller 101 may learn that an exception of the hard disk indicates that a faulty area occurs, and data in the faulty area is lost. Optionally, the array controller 101 may further obtain the capacity of the faulty area from a byte corresponding to the information.

2. ATA Protocol

In the ATA protocol, a solid-state device statistics page is defined, and the statistics page is used to record exception information of exceptions of the hard disk that are detected by the hard disk. In this embodiment of the present disclosure, new exception information, namely, uncorrectable flash unit error information, is defined, and is used to record fault information of a faulty area in the hard disk. As shown in FIG. 8, the information is represented by using a 64-bit binary number. A bit 0 to a bit 15 are set to 00000010 (represented by 0002 in hexadecimal in the figure), and is an identifier of the solid-state device statistics page. A bit 16 to a bit 23 are used to indicate whether there is a faulty area in the hard disk. If there is a faulty area, the bit 16 to the bit 23 are set to 00000001 (represented by 01 in hexadecimal in the figure). If there is no faulty area, the bit 16 to the bit 23 are set to 00000000 (represented by 00 in hexadecimal in the figure). A bit 24 to a bit 31 are used to indicate whether data in the faulty area is lost. If data is lost, the bit 24 to the bit 31 are set to 00000001 (represented by 01 in hexadecimal in the figure). If no data is lost, the bit 24 to the bit 31 are set to 00000000 (which may be represented by 00 in hexadecimal). In addition, the hard disk further records the capacity of the faulty area on the solid-state device statistics page. For example, a parameter, namely, an uncorrectable capacity parameter, is defined in bytes 24 to 31 in FIG. 8, and is also of 64 bits. The fault capacity of the faulty area is recorded at a location corresponding to the parameter. In this embodiment of the present disclosure, the reported capacity is 00 00 00 00 00 01 00 00 (in hexadecimal), namely, 8G.

The array controller 101 periodically sends a fault query command to the hard disk 105, where the fault query command carries an identifier of the solid-state device statistics page. After receiving the fault query command, the hard disk returns the solid-state device statistics page to the array controller 101. After receiving the solid-state device statistics page, the array controller 101 obtains the uncorrectable flash unit error information from the solid-state device statistics page, namely, the 64-bit binary number (or a 16-bit hexadecimal number). The array controller 101 may obtain the information about the faulty area in the hard disk 105 by analyzing the uncorrectable flash unit error information.

3. NVMe Protocol

In the NVMe protocol, a health information log is defined, and the log is used to record exception information of exceptions of the hard disk that are detected by the hard disk. As shown in FIG. 9, different exception information in the hard disk is defined in different bits in a byte 0 in the health information log. The first, second, third, and fourth bits are exception information defined in the existing NVMe protocol, and are not described herein because the bits are not related to the present disclosure. In this embodiment of the present disclosure, the fifth bit is newly defined to indicate whether a faulty area occurs in the hard disk 105. When a value of the fifth bit is 1, it indicates that a faulty area occurs in the hard disk 105. In addition, a 32-bit character string is defined in four bytes, namely, the sixth to ninth bytes. A most significant bit, namely, a bit 7 in the ninth byte, is used to indicate whether data in the faulty area is lost. For example, when the bit is set to 1, it indicates that data in the faulty area is lost, or when the bit is set to 0, it indicates that no data in the faulty area is lost. Bits after the most significant bit are used to indicate a fault capacity of a faulty chunk. For example, "00 00 00 00 00 01 00 00" in hexadecimal indicates that no data in the faulty chunk is lost and the fault capacity of the faulty chunk is 8 GB, and "80 00 00 00 00 01 00 00" (where a most significant bit in hexadecimal is 8, that is, a most significant bit in binary is 1) indicates that no data in the faulty chunk is lost and the fault capacity of the faulty chunk is 8 GB.

When statistics about the fault capacity of the faulty chunk that are collected by the hard disk reach a preset value, the hard disk reports the health information log to the array controller 101 by using a response to an asynchronous event request. The array controller 101 may obtain the fault information of the faulty area by analyzing the health information log.

Step S403: The array controller 101 obtains the capacity of the faulty area of the hard disk 105 from the fault information, and adds information about the obtained capacity to a total fault capacity that is of the hard disk and that is recorded by the array controller 101. When the total fault capacity of the hard disk 105 reaches a preset value, the array controller 101 notifies a user to replace the hard disk 105.

Step S404: If the fault information indicates that data in the faulty area is lost, the array controller 101 determines a chunk in which the lost data is located.

In this embodiment of the present disclosure, two methods for determining the chunk in which the lost data is located are provided. In a first method, the array controller 101 obtains an address of each chunk belonging to the hard disk in the hard disk 105. When the hard disk is an SSD, the address in the hard disk 105 is a logical address in the hard disk. Then, the array controller 101 sends a data loss query command to the hard disk 105, where the query command carries a logical address of one of chunks. As described in FIG. 2, when constructing the storage resource pool, the array controller 101 records a chunk belonging to each hard disk. Therefore, when determining the chunk in which the lost data is located, the array controller 101 queries a logical address of the lost data in the hard disk at a granularity of the chunk. When receiving the data loss query command, the hard disk determines whether the logical address carried in the data loss query command includes a part or all of an address of the faulty area, and if the logical address carried in the data loss query command includes the part or all of the address of the faulty area, reports an identifier indicating that data is lost to the storage controller 101, or if the logical address carried in the data loss query command does not include the part or all of the address of the faulty area, reports an identifier indicating that no data is lost to the storage controller 101. After receiving reporting information, if the reporting information includes the identifier indicating that data is lost, the storage controller 101 uses, as the chunk in which the lost data is located, the chunk indicated by the logical address that is of the chunk and that is carried in the data loss query command. In an implementation, the faulty area reported by the hard disk is usually smaller than a chunk. In this implementation, if the reporting information includes the identifier indicating that no data is lost, a new data loss query command is sent to the hard disk, where the new data loss query command carries a logical address of another chunk in the hard disk, until the chunk in which the lost data is located is found. In another implementation, if the faulty area reported by the hard disk is larger than a chunk, the array controller sends an address of a chunk to the hard disk each time to determine a faulty chunk, and after receiving return information of a chunk, sends an address of a next chunk to the hard disk, until addresses of all chunks in the hard disk are sent to the hard disk, to determine a plurality of chunks in which the lost data is located.

In a second method, the array controller 101 sends a fault list query command to the hard disk 105. After receiving the query command, the hard disk 105 reports a recorded logical address list of the faulty area to the array controller 101, and the array controller 101 may determine, based on the reported logical address list, the chunk in which the lost data is located.

Step S405: After determining the chunk in which the lost data is located, namely, a faulty chunk, the array controller 101 recovers data in the faulty chunk by using another chunk in a chunk group including the faulty chunk and a RAID algorithm.

Step S406: The array controller 101 stores the recovered data in an idle chunk in the hot spare space or an OP space, where the idle chunk is a backup chunk. A hard disk in which the backup chunk is located is different from a hard disk in which the other chunk in the chunk group is located.

Step S407: The array controller 101 records a mapping relationship between an address of the faulty chunk in the hard disk and an address of the backup chunk in a backup space or the OP space.

In this way, when subsequently receiving a request for updating the data in the faulty chunk, the array controller 101 writes to-be-written data in the request into the backup chunk, and sets the data in the faulty chunk to be invalid, and may release space other than the faulty area in the faulty chunk in a subsequent garbage collection process.

In Embodiment 2 of the present disclosure, after recovering the recovered data to the backup chunk in step S406, the array controller 101 replaces the faulty chunk in the chunk group with the recovered chunk. During the replacement, the array controller 101 may replace an address of the faulty chunk in the first hard disk that is recorded in metadata in the chunk group with an address of the recovered chunk in a hard disk in which the recovered chunk is located.

Figure 10:
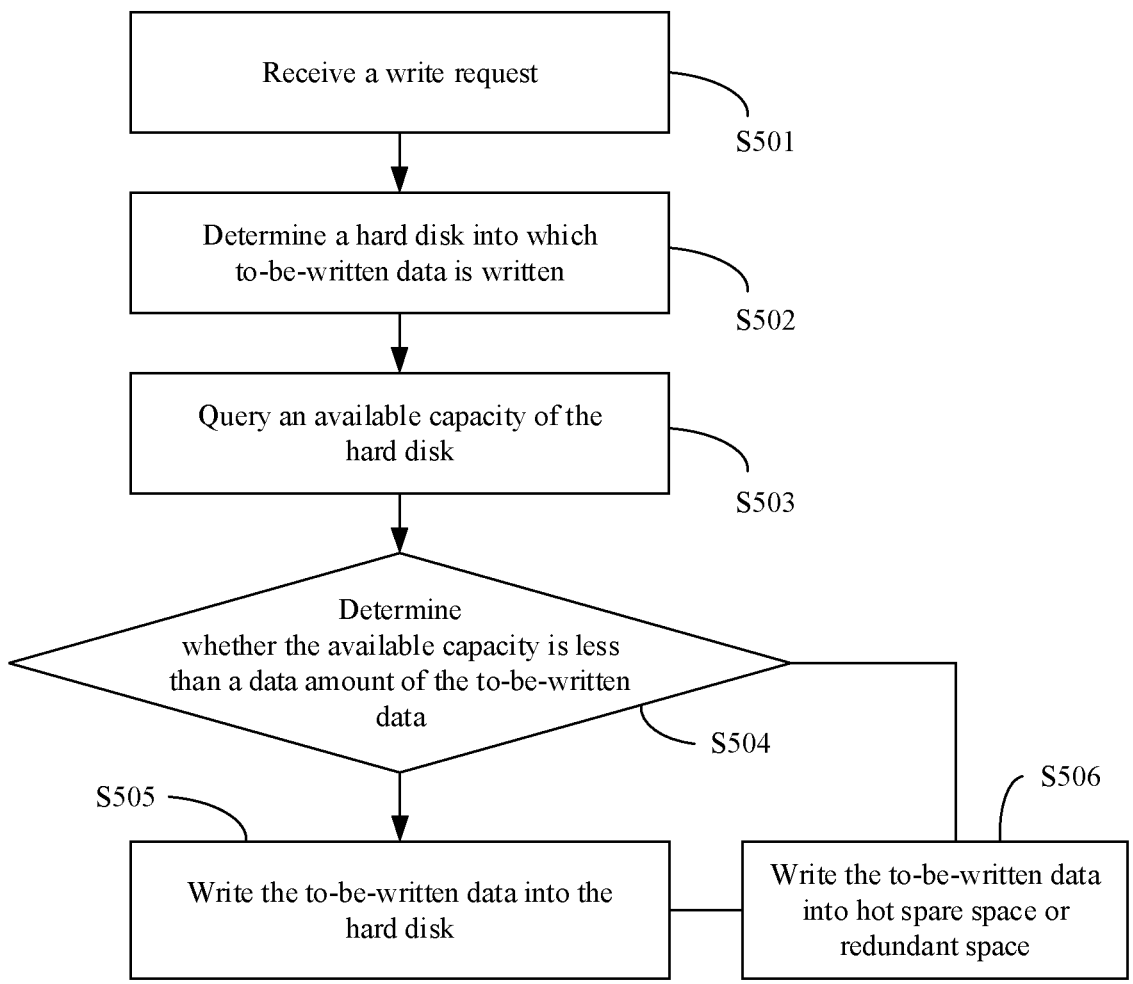
FIG. 10 is a flowchart of a handling method performed when an array controller receives a rewrite request according to an embodiment of the present disclosure.

After the hard disk reports a lost capacity of the hard disk, the array controller 101 records a lost capacity of each hard disk, calculates a current available capacity of each hard disk, and restricts data to be written into a hard disk with a relatively large lost capacity. FIG. 10 is a flowchart of a handling method performed when the array controller 101 receives a rewrite request for data in a hard disk.

Step S501: Receive a write request, where the write request carries to-be-written data, a logical address of the to-be-written data, and a data amount of the to-be-written data.

Step S502: Determine, based on the logical address of the to-be-written data, that a target hard disk of the to-be-written data is the hard disk 105.

Step S503: Query an available capacity of the hard disk 105.

Step S504: Determine whether the available capacity of the hard disk is less than the data amount of the to-be-written data.

Step S505: If the available capacity of the hard disk is greater than the data amount of the to-be-written data, write the to-be-written data into the hard disk.

Step S506: If the available capacity of the hard disk is less than or equal to the data amount of the to-be-written data, write the to-be-written data into the hot spare space or the redundant space, mark data that is in the hard disk 105 and to which the logical address points as garbage data, and wait for subsequent garbage collection.

After the array controller 101 marks an available capacity of each hard disk, when a new chunk group needs to be created subsequently, a hard disk with a large available capacity may be selected to create the chunk group. Available capacity of the hard disk=Nominal capacity of the hard disk−Lost capacity−Used space.

Figure 11:
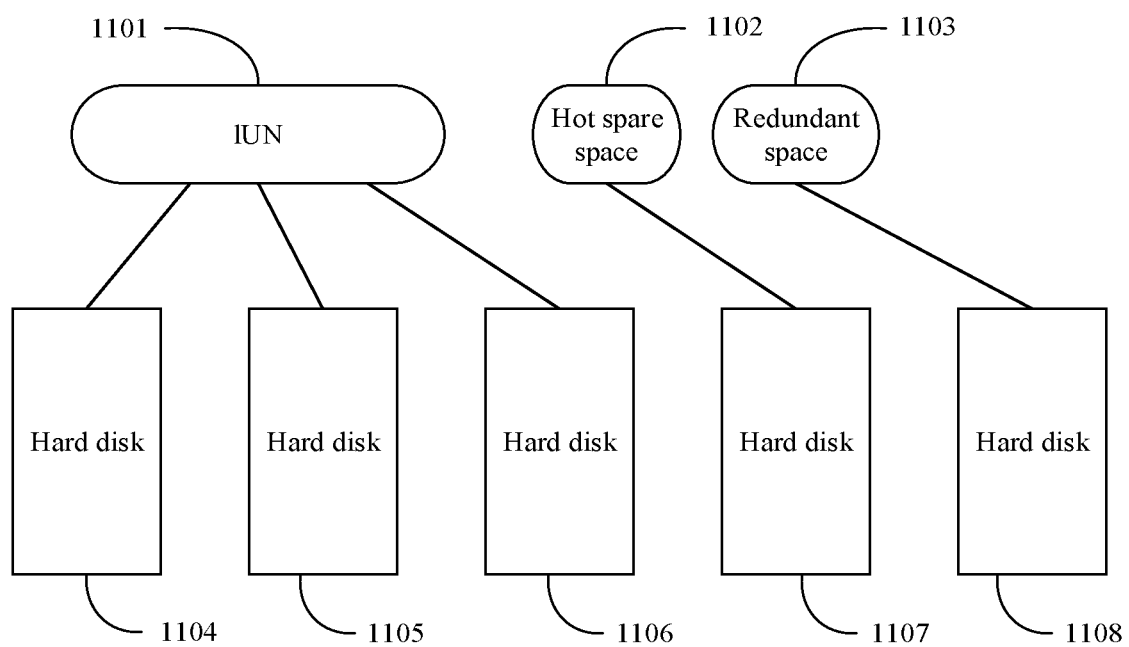
FIG. 11 is a schematic diagram of forming a logical disk by an array controller by using a plurality of independent hard disks and a Redundant Array of Independent Disks (RAID) algorithm according to an embodiment of the present disclosure.

FIG. 11 shows a logical disk LNU 1101 formed by a plurality of independent hard disks 1104 to 1106 by using a RAID algorithm according to Embodiment 3 of the present disclosure. Hot spare space 1102 and redundant space 1103 are also provided by independent hard disks 1107 and 1108.

Figure 12:
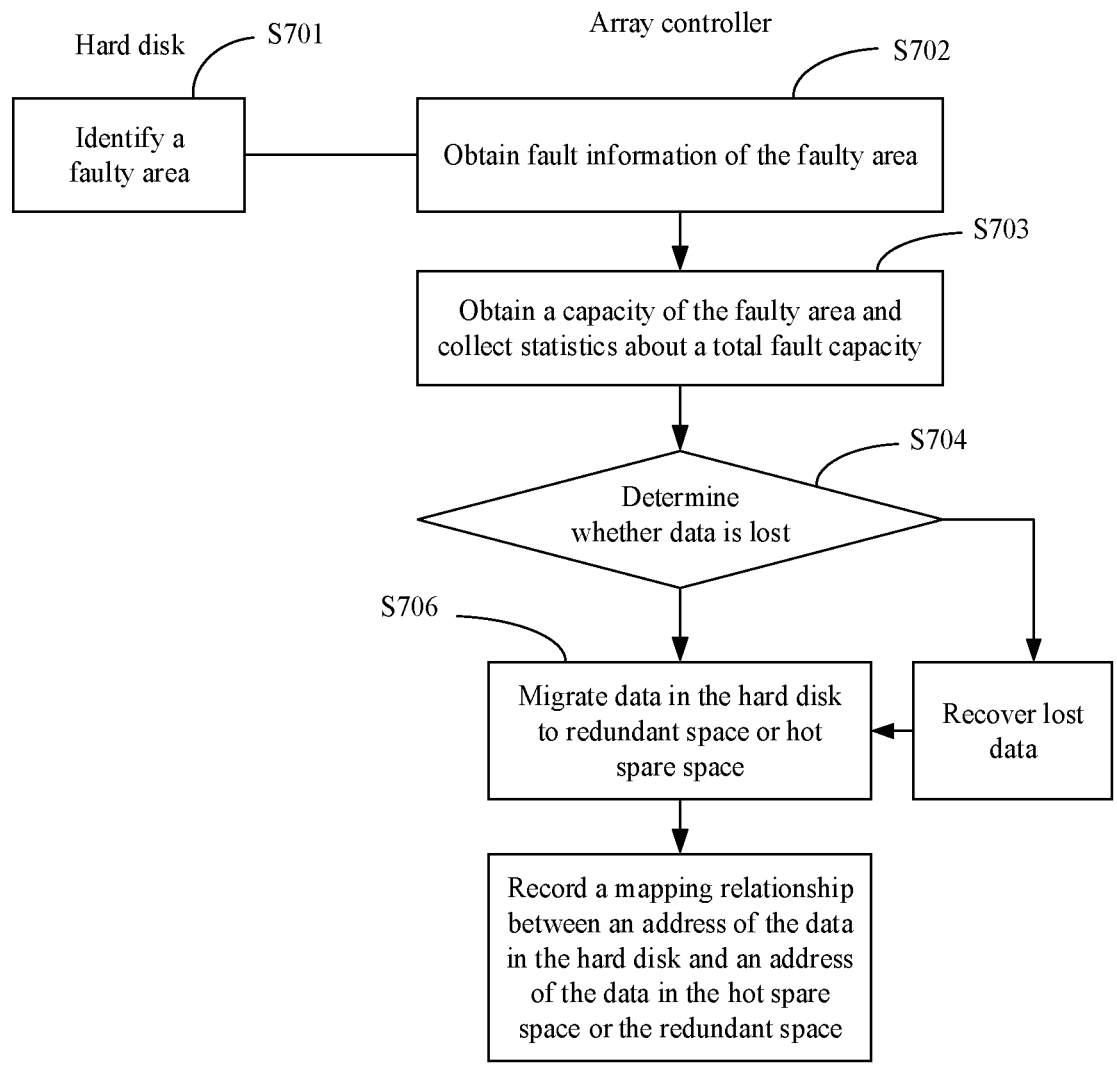
FIG. 12 is a flowchart of a method for processing a faulty area in a hard disk according to Embodiment 2 of the present disclosure.

The following describes, by using a flowchart shown in FIG. 12, how to process a faulty area in a hard disk in Embodiment 3.

In Embodiment 3, steps S701 to S703 are the same as steps S401 to S403 in FIG. 4 in Embodiment 1. Details are not described herein again.

Step S704: The array controller 101 obtains the identifier indicating whether data in the faulty area is lost from the fault information.

Step S705: If the identification information indicates that no data in the faulty area is lost, the array controller 101 migrates data that is in the hard disk 105 and that has the same capacity as the lost capacity to the hot spare space 1102 or the redundant space 1103.

Step S706: If the identification information indicates that data in the faulty area in the hard disk is lost, the array controller 101 recovers the data in the hard disk by using a RAID algorithm, and performs step S705 after the recovery, that is, migrates the data that is in the hard disk 105 and that has the same capacity as the lost capacity to the hot spare space 1102 or the redundant space 1103.

Step S707: Record a mapping relationship between an address of the migrated data in the hard disk 105 in the hard disk 105 and an address of the data migrated to the hot spare space or the redundant space.

When an access request for accessing the migrated data is subsequently received, the migrated data may be accessed in the hot spare space or the redundant space based on the mapping relationship.

In this way, the redundant space or the hot spare space is used to compensate for the lost space of the faulty area in the hard disk. Therefore, the redundant space in the hard disk does not need to be used to compensate for the faulty area in the hard disk. In this way, even if the faulty area occurs in the hard disk, the redundant space of the hard disk is not reduced, so that a wear degree of the hard disk is not increased, and performance of the storage array is ensured.

Figure 13:
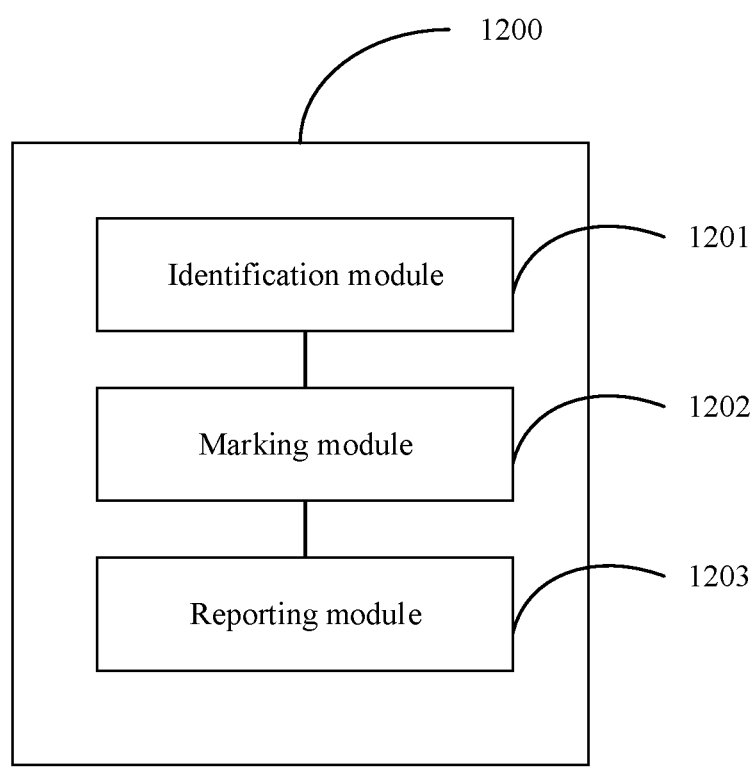
FIG. 13 is a module diagram of a hard disk according to an embodiment of the present disclosure.

FIG. 13 is a module diagram of a hard disk 1200 according to an embodiment of the present disclosure.

The hard disk 1200 includes an identification module 1201, a marking module 1202, and a reporting module 1203. The identification module 1201 is configured to identify a faulty area in the hard disk 105, and accumulate capacities of faulty areas. A function performed by the identification module 1201 is the same as that in step S401 in FIG. 4. For a manner of identifying the faulty area and accumulate the capacities of the faulty areas, refer to the descriptions in step S401. The marking module 1202 is configured to mark fault information of the identified faulty area. For a marking method, refer to the related descriptions in step S402 of how the hard disk marks the fault information of the faulty area in different protocols, for example, the SCSI protocol, the ATA protocol, and the NVMe protocol. For details, refer to the related descriptions in FIG. 4, FIG. 5, FIG. 8, and FIG. 9.

The reporting module 1203 is configured to report the fault information marked by the marking module 1202 to the array controller. For a specific manner of reporting the fault information by the reporting module 1203, refer to the related descriptions in step S402 of how the hard disk reports the fault information of the faulty area in different protocols, for example, the SCSI protocol, the ATA protocol, and the NVMe protocol. Details are not described herein again.

Figure 14:
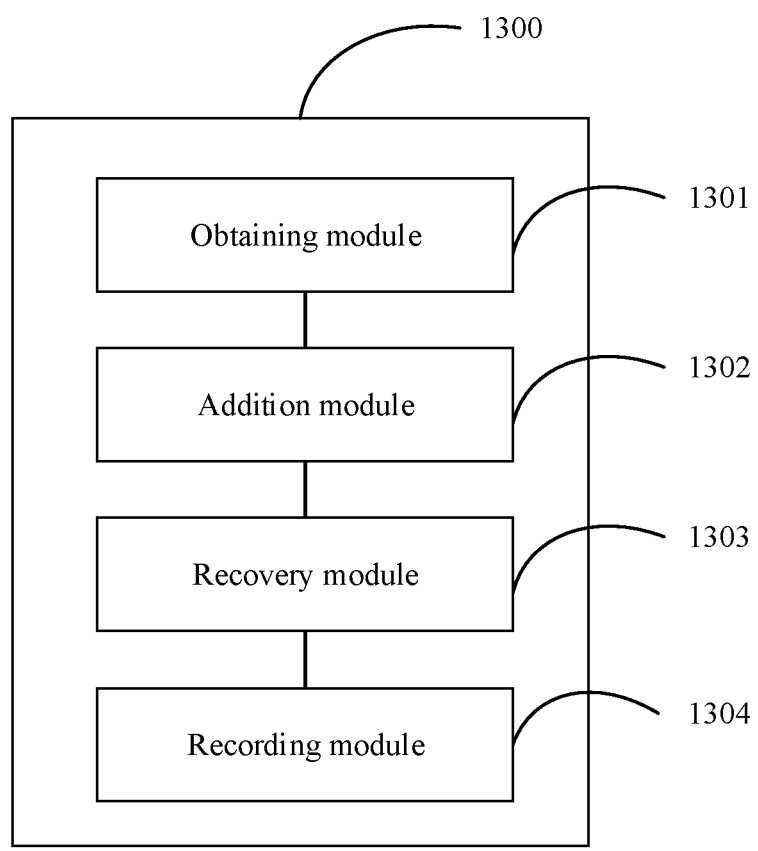
FIG. 14 is a module diagram of an array controller according to Embodiment 1 of the present disclosure.

FIG. 14 is a module diagram of an array controller 1300 according to Embodiment 1 of the present disclosure. The array controller 1300 includes an obtaining module 1301, an addition module 1302, a recovery module 1303, and a recording module 1304. The obtaining module 1301 is configured to obtain fault information of a faulty area in a hard disk. For a manner of obtaining the fault information of the faulty area in the hard disk, refer to the related descriptions in step S402. Manners of obtaining the fault information in different protocols, for example, the SCSI protocol, the ATA protocol, and the NVMe protocol, are different. For details, refer to the descriptions in step S402. Details are not described herein again.

The addition module 1302 is configured to obtain a capacity of faulty area in the hard disk from the fault information, and add information about the obtained capacity to a recorded total fault capacity of the hard disk, and when the total fault capacity of the hard disk reaches a preset value, notify a user to replace the hard disk. For details, refer to the related descriptions in step S403.

The recovery module 1303 is configured to after the obtaining module obtains the fault information of the faulty area in the hard disk, if the fault information indicates that data in the faulty area is lost, determine a faulty chunk in which the lost data is located, and recover the data in the faulty chunk by using another chunk in a chunk group including the faulty chunk and an RAID algorithm, then store the recovered data in a backup chunk, and form a new chunk group by using the backup chunk and a chunk other than the faulty chunk in the chunk group. For details, refer to the related descriptions in steps S404 to S407.

The recording module 1304 is configured to record a mapping relationship between an address of the faulty chunk in the hard disk and an address of the backup chunk in the backup space or the OP space. For details, refer to the related descriptions in step S407.

An array controller in Embodiment 2 of the present disclosure has same functions as the obtaining module 1301, the addition module 1302, and the recovery module 1303 in the array controller in Embodiment 1. A difference lies in that in Embodiment 2, a recording module replaces the faulty chunk in the chunk group with the recovered chunk. During the replacement, the recording module may replace an address of the faulty chunk in the first hard disk that is recorded in metadata in the chunk group with an address of the recovered chunk in a hard disk in which the recovered chunk is located.

Figure 15:
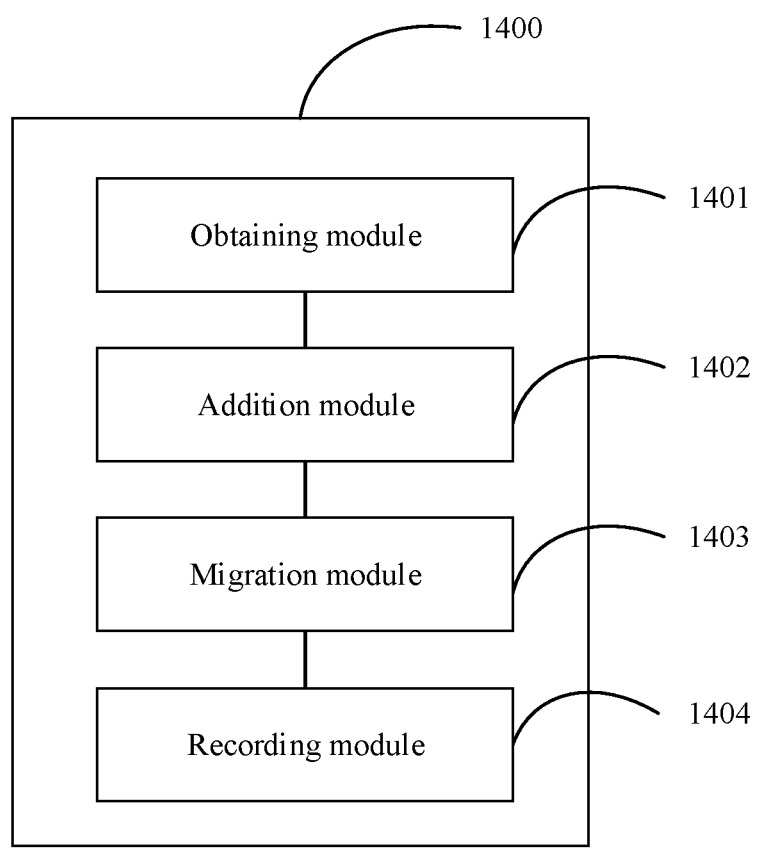
FIG. 15 is a module diagram of an array controller according to Embodiment 2 of the present disclosure.

FIG. 15 is a module diagram of an array controller 1400 according to Embodiment 3 of the present disclosure. The array controller 1400 includes an obtaining module 1401, an addition module 1402, a migration module 1403, and a recording module 1404.

Functions of the obtaining module 1401 and the addition module 1402 are the same as the functions of the obtaining module 1301 and the addition module 1302 in the array controller 1300. For details, refer to the related descriptions of the obtaining module 1301 and the addition module 1302. Details are not described herein again. The migration module 1403 is configured to if the fault information indicates that no data in the faulty area is lost, migrate data that is in the hard disk and that has a the same capacity as the lost capacity to the hot spare space or the redundant space, or if the fault information indicates that data in the faulty area in the hard disk is lost, recover the data in the hard disk by using an RAID algorithm, and migrate, after the recovery, the data that is in the hard disk and that has the same capacity as the lost capacity to the hot spare space or the redundant space. For details, refer to the related descriptions of steps S704 to S706.

The recording module 1404 is configured to record a mapping relationship between an address of the migrated data in the hard disk 105 in the hard disk 105 and an address of the data migrated to the hot spare space or the redundant space. For details, refer to the related descriptions of step S707. When an access request for accessing the migrated data is subsequently received, the migrated data may be accessed in the hot spare space or the redundant space based on the mapping relationship.

One or more of the foregoing modules may be implemented by using software, hardware, or a combination thereof. When any one of the foregoing modules or units is implemented by using software, the software exists in a form of a computer program instruction, and is stored in a memory. A processor may be configured to execute the program instruction to implement the foregoing method procedures. The processor may include but is not limited to at least one of the following computing devices that run various types of software: a central processing unit (CPU), a microprocessor, a digital signal processor (DSP), a microcontroller unit (MCU), an artificial intelligence processor, or the like. Each computing device may include one or more cores configured to perform an operation or processing by executing a software instruction. The processor may be embedded in a system-on-a-chip (SoC) or an application-specific integrated circuit (ASIC), or may be an independent semiconductor chip. In addition to the core configured to perform an operation or processing by executing a software instruction, the processor may further include a necessary hardware accelerator, for example, a field-programmable gate array (FPGA), a programmable logic device (PLD), or a logic circuit that implements a dedicated logic operation.

When the foregoing modules or units are implemented by using hardware, the hardware may be any one or any combination of a CPU, a microprocessor, a DSP, an MCU, an artificial intelligence processor, an ASIC, an SoC, an FPGA, a PLD, a dedicated digital circuit, a hardware accelerator, or a non-integrated discrete device, and the hardware may run necessary software or does not depend on software, to perform the foregoing method procedures.

The foregoing describes the hard disk fault handling method, the array controller, and the hard disk provided in the embodiments of the present disclosure. In this specification, specific examples are used to describe the principle and implementations of the present disclosure, and the descriptions of the embodiments are merely intended to help understand the method and core idea of the present disclosure. In addition, a person of ordinary skill in the art may make, based on the idea of the present disclosure, modifications with respect to the specific implementations and the application scope. Therefore, the content of this specification shall not be construed as a limitation to the present disclosure.

What is claimed is:

1. A method implemented by a controller, wherein the method comprises:
   receiving, from a Non-Volatile Memory Express (NVMe) hard disk and using an NVMe protocol, an alarm for notifying the controller that the NVMe hard disk has one or more faulty logical addresses;
   sending, in response to receiving the alarm, a query command to the NVMe hard disk, wherein the query command is for querying the NVMe hard disk for the one or more faulty logical addresses; and
   receiving, from the NVMe hard disk, the one or more faulty logical addresses.

2. The method of claim 1, further comprising recovering, in response to receiving the one or more faulty logical addresses, data stored in the one or more faulty logical addresses.

3. The method of claim 2, further comprising recovering the data based on a redundant array of independent disks (RAID) algorithm.

4. The method of claim 2, further comprising writing the data into locations of original logical addresses.

5. The method of claim 1, wherein the NVMe protocol comprises a health information log that comprises a zeroth byte, and wherein a fifth bit of the zeroth byte indicates whether the NVMe hard disk comprises a faulty area.

6. The method of claim 5, wherein a value of one for the fifth bit indicates that the NVMe hard disk comprises the faulty area.

7. The method of claim 5, wherein the health information log further comprises a ninth byte, and wherein a seventh bit in the ninth byte indicates whether data in the faulty area is lost.

8. The method of claim 1, wherein the alarm is an asynchronous alarm.

9. The method of claim 1, wherein the one or more faulty logical addresses indicate a failure of a component of the NVMe hard disk.

10. The method of claim 9, wherein the component comprises a die.

11. A controller, comprising:
    an interface configured to communicate with a Non-Volatile Memory Express (NVMe) hard disk using an NVMe protocol; and
    a processor coupled to the interface and configured to:
       receive, from the NVMe hard disk, an alarm for notifying the controller that the NVMe hard disk has one or more of faulty logical addresses;
       send, in response to receiving the alarm, a query command to the NVMe hard disk, wherein the query command is for querying the NVMe hard disk for the one or more faulty logical addresses; and
       receive, from the NVMe hard disk, the one or more faulty logical addresses.

12. The controller of claim 11, wherein the processor is further configured to recover, in response to receiving the one or more faulty logical addresses, data stored in the one or more faulty logical addresses.

13. The controller of claim 12, wherein the processor is further configured to recover the data based on a redundant array of independent disks (RAID) algorithm.

14. The controller of claim 13, wherein the processor is further configured to write the data into locations of original logical addresses.

15. The controller of claim 11, wherein the NVMe protocol comprises a health information log that comprises a zeroth byte, and wherein a fifth bit of the zeroth byte indicates whether the NVMe hard disk comprises a faulty area.

16. The controller of claim 15, wherein a value of one for the fifth bit indicates that the NVMe hard disk comprises the faulty area.

17. The controller of claim 15, wherein the health information log further comprises a ninth byte, and wherein a seventh bit in the ninth byte indicates whether data in the faulty area is lost.

18. The controller of claim 11, wherein the alarm is an asynchronous alarm.

19. The controller of claim 11, wherein the one or more faulty logical addresses indicate a failure of a component of the NVMe hard disk.

20. The controller of claim 19, wherein the component comprises a die.

* * * * *